United States Patent [19]

Okuda et al.

[11] Patent Number: 5,195,004

[45] Date of Patent: Mar. 16, 1993

[54] METHOD OF MANUFACTURING A MAGNETIC CORE HALF

[75] Inventors: Hiroyuki Okuda, Daitoh; Yoshiaki Shimizu, Minoh; Kazuo Ino, Matasubara; Kousou Ishihara; Takashi Ogura, both of Daitoh, all of Japan

[73] Assignee: Sanyo Electric Co., Ltd., Osaka, Japan

[21] Appl. No.: 826,192

[22] Filed: Jan. 21, 1992

Related U.S. Application Data

[60] Continuation of Ser. No. 540,534, Jun. 19, 1990, abandoned, which is a division of Ser. No. 218,018, Jul. 12, 1988, Pat. No. 4,953,049.

[30] Foreign Application Priority Data

Jul. 14, 1987 [JP] Japan ................ 62-175157
Aug. 4, 1987 [JP] Japan ................ 62-194893

[51] Int. Cl.$^5$ .................... G11B 5/147; G11B 5/42
[52] U.S. Cl. ........................ 360/126; 29/603
[58] Field of Search ............ 360/119, 120, 125, 126, 360/127; 29/603

[56] References Cited

U.S. PATENT DOCUMENTS 4,439,794 3/1984 Shiroshi et al. .
4,656,547 4/1987 Kumasaka et al. ............ 360/122
4,841,400 6/1989 Matsuzawa .

FOREIGN PATENT DOCUMENTS 0238793 9/1987 European Pat. Off. .
62-57115 3/1987 Japan .
62-145510 6/1987 Japan .
8303918 11/1983 PCT Int'l Appl. .

Primary Examiner—David J. Severin
Attorney, Agent, or Firm—Nikaido, Marmelstein, Murray & Oram

[57] ABSTRACT

A magnetic head comprises a pair of magnetic core halves, heat-resistant thin films and ferromagnetic thin films, the pair of magnetic core halves being opposed to each other through a non-magnetic material such as $SiO_2$ to form a magnetic gap. The magnetic core halves are made of a ferromagnetic oxide such as ferrite and have gap forming faces to be opposed to each other to form the magnetic gap. The gap forming faces are etched by phosphoric acid solution and then purified by reverse sputtering, so that a grown crystal of the ferromagnetic oxide is exposed on the gap forming faces. A heat-resistant thin film of a heat-resistant material such as $SiO_2$ is formed on each of the gap forming faces. A ferromagnetic thin film of a ferromagnetic metal material such as sendust is formed on each heat-resistant thin film. Preferably, the thickness of the heat-resistant thin film to be formed is 1 nm or more and one tenth or less of the width of the magnetic gap. For example, $SiO_2$ films of 5 nm in thickness as the heat-resistant thin films are formed on the respective gap forming faces and sendust films of 3 μm in thickness as the ferromagnetic metal thin films are formed on the respective $SiO_2$ films. In this case, the gap length of the magnetic gap is set to 0.2 μm.

8 Claims, 17 Drawing Sheets

FIG. 10A
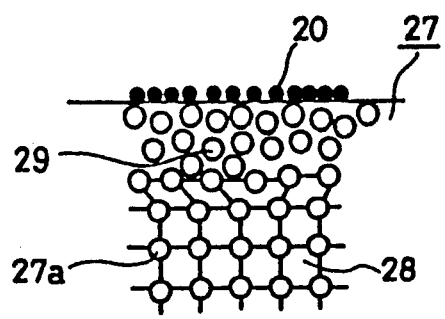
O : CONSTITUENT ATOMS OF FERRITE
● : IMPURITY ATOMS OF H, O, C, N ETC.
⊚ : Ar⁺ IONS AND Ar MOLECULES
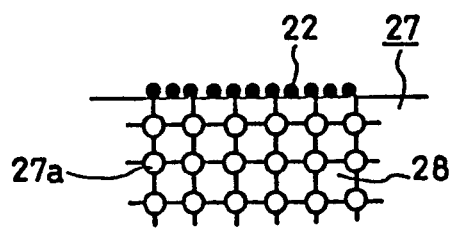
FIG. 10B
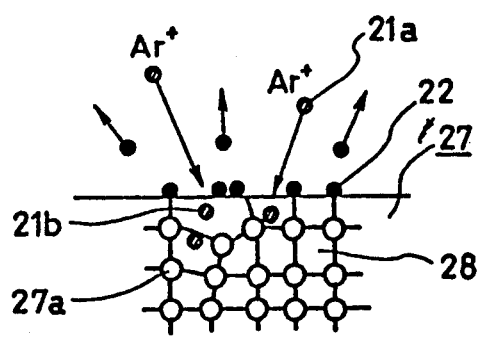
FIG. 10C
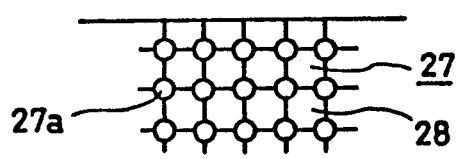
FIG. 10D FIG. 14A
FIG. 14B
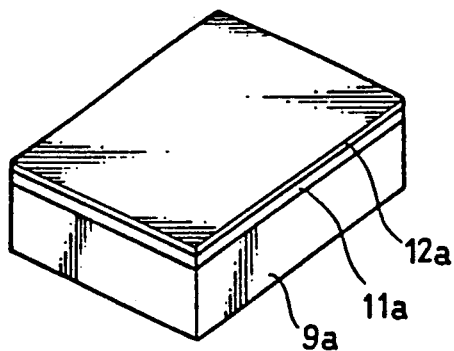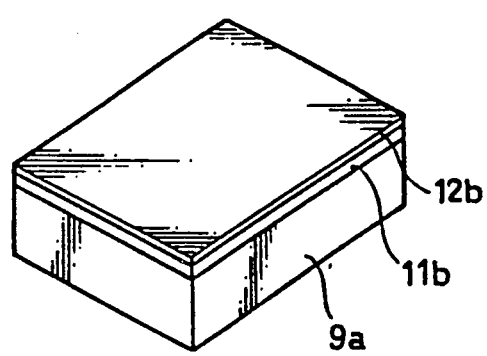
FIG. 15A
FIG. 15B
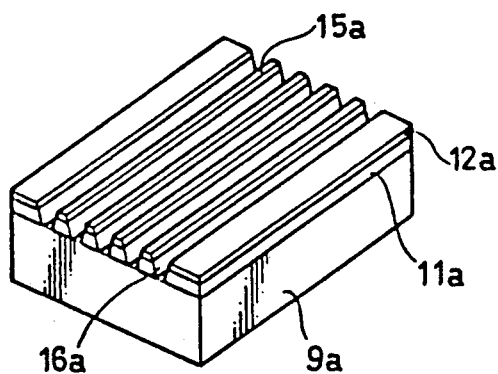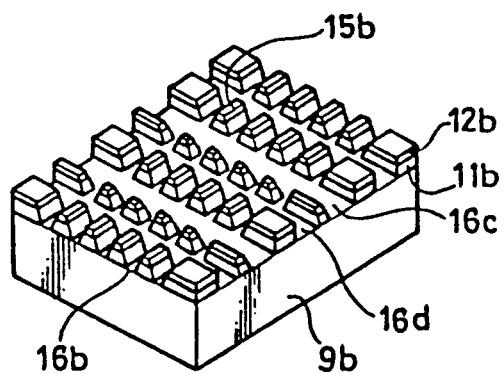
FIG. 16
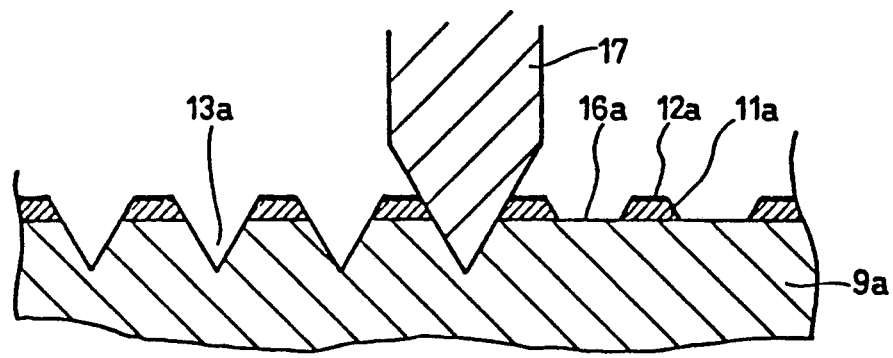

1

METHOD OF MANUFACTURING A MAGNETIC CORE HALF

This application is a continuation of application Ser. No. 540,534 filed Jun. 19, 1990 now abandoned which is a division of application Ser. No. 218,018 filed Jul. 12, 1988 now U.S. Pat. No. 4,953,049.

BACKGROUND OF THE INVENTION

1. Field of the Invention

The present invention relates to a magnetic head and a method of manufacturing thereof. More particularly, it relates to a magnetic head for use in a magnetic recording and reproducing apparatus such as a video tape recorder (VTR) or a digital audio tape recorder (DAT), and a method of manufacturing thereof.

2. Description of the Prior Art

In recent years, there has been an increasing tendency for high density recorded signals in a magnetic recording and reproducing apparatus such as a VTR or a DAT. Metal tapes of high coercive force formed by using ferromagnetic metal powder such as Fe, Co or Ni as magnetic powder have been used for such high-density recording. For example, metal tapes having a high coercive force, Hc=about 1400 to 1500 oersteds are used for small-sized VTRs known as 8 mm video tape recorders. This is because a recording medium making it possible to shorten wavelengths of recorded signals is required for the necessity of increasing a recording density to reduce a size of a magnetic recording and reproducing apparatus.

On the other hand, if a conventional magnetic head made only of ferrite is used for recording on a metal tape, a magnetic saturation phenomenon occurs because a saturation flux density of ferrite is only 5500 gauss at most, and accordingly optimum performance of the metal tape cannot be achieved. A magnetic head adapted for a metal tape having a high coercive force needs to have a high saturation flux density in the vicinity of a gap of a magnetic core, other than high-frequency characteristics and abrasion resistance of the magnetic core as generally required for magnetic heads. In order to satisfy such requirements, it is proposed to use, as a magnetic head adapted for a metal tape, a magnetic head made of a metallic magnetic material such as permalloy, sendust or amorphous magnetic material having a larger saturation magnetization than that of ferrite used for a magnetic core (such a magnetic head being hereinafter referred to as a composite type magnetic head). Such a composite type magnetic head has excellent characteristics in reliability, magnetic properties, abrasion resistance and the like.

FIG. 1 is a perspective view showing an appearance of a conventional magnetic head. As shown in FIG. 1, a pair of magnetic core halves 1a and 1b made of a ferromagnetic oxide such as Mn-Zn ferrite are opposed to each other through a non-magnetic material with a magnetic gap 2 being provided therebetween, and thin films 3a and 3b of a ferromagnetic metal such as sendust having a high saturation flux density are formed near the magnetic gap 2. The magnetic core halves 1a and 1b are joined by glass 4 with a coil groove 5 being provided.

In the composite type magnetic head thus provided, the thin films 3a and 3b of the ferromagnetic metal are deposited by sputtering on upper surface areas of the base of the ferromagnetic oxide where mirror surface finishing has been applied. However, junction regions between the thin films of the ferromagnetic metal and the base of the ferromagnetic oxide are non-magnetized due to interdiffusion and chemical reactions of constituent elements, or irregular arrangement in crystal structure. As a result, those regions function as pseudo gaps, exerting adverse effect on the performance of the magnetic head.

More specifically, as shown in FIG. 1, pseudo gaps are formed on boundary faces 6a and 6b between the magnetic core halves 1a and 1b and the thin films 3a and 3b of the ferromagnetic metal, respectively, other than the prescribed magnetic gap 2. If a singly reverse-magnetized recorded signal on a magnetic tape is reproduced by using the magnetic head having boundary faces 6a and 6b where such pseudo gaps are formed as shown in FIG. 3, pseudo signals 8a and 8b are reproduced with deviations of time $\tau = t/v$ before and after reproduction of the prescribed signal 7. In the equation $\tau = t/v$, t represents a thickness of each of the ferromagnetic metal thin films 3a and 3b in the relative traveling direction defined between the head and the tape, and v represents a relative traveling speed defined between the head and the tape.

On the other hand, if continuously reverse-magnetized recorded signals having a recorded wavelength λ substantially equal to or shorter than t are reproduced, the pseudo signals 8a and 8b as shown in FIG. 3 cannot be readily observed. However, if the frequency characteristics of the reproduced output are measured, a frequency characteristic curve which waves with peaks at a frequency satisfying $f = n \cdot (v/t)$ and bottoms at a frequency satisfying $f = (n - \frac{1}{2}) \cdot (v/t)$, where f indicates frequency (v/λ) and n indicates a natural number, is obtained as shown in FIG. 4 by superposition of the reproduced output through the pseudo gap onto the reproduced output through the prescribed magnetic gap 2. Accordingly, if a magnetic head having boundary faces 6a and 6b where such pseudo gaps are formed is used for a VTR or DAT, pseudo signals due to the pseudo gaps cause noises, resulting in a deterioration of the quality of the picture or adverse effects on the performance of the magnetic head, such as increase of an error rate. Particularly, in the case of using a magnetic head having a magnetic gap 2 parallel to the boundary faces 6a and 6b where such pseudo gaps as shown in FIG. 1 are generated, a waving phenomenon in the frequency characteristics of the reproduced output is observed and the S/N ratio is deteriorated.

In order to suppress generation of such pseudo gaps, it is proposed to adopt a method for applying reverse sputtering to a surface of a base member of a ferromagnetic oxide such as ferrite under suitable power supply conditions immediately before formation of thin films of ferromagnetic metal, as disclosed for example in Japanese Patent Laying-Open No. 57115/1987. However, even this method cannot completely remove portions adversely affected by the treating process of the thin films, which would cause the pseudo gaps, and accordingly this method is not sufficiently effective for preventing generation of pseudo gaps.

Further, in order to suppress generation of pseudo gaps, another proposal is made in Japanese Patent Laying-Open No. 145510/1987, which discloses a magnetic head having, near a magnetic gap, a reaction prevention layer of an oxide material and a metal material in the interface between a ferromagnetic oxide and each thin film of ferromagnetic metal. However, generation of pseudo gaps cannot be sufficiently suppressed only by such interposition of the reaction prevention layer on the surface forming a gap.

Further, as shown in FIG. 2, a composite type magnetic head is proposed in which boundary faces 6a and 6b between magnetic core halves 1a and 1b and thin films 3a and 3b of ferromagnetic metal, respectively, have an inclination and are not parallel to the faces forming the magnetic gap 2, causing no adverse effect to the performance of the head even if the pseudo gaps are generated. However, the magnetic head having such structure is not suited for mass production because the manufacturing process thereof is complicated and the manufacturing cost comes to be high compared with the magnetic head having the boundary faces 6a and 6b parallel to the magnetic gap 2 as shown in FIG. 1.

SUMMARY OF THE INVENTION

The present invention has been accomplished to solve the above described difficulties and it is an object of the present invention to provide a magnetic head and a method of manufacturing thereof with simplified manufacturing processes, which makes it possible to effectively suppress generation of pseudo gaps in junction regions between magnetic core halves and thin films of ferromagnetic metal or to effectively prevent the junction regions from exerting adverse effect as a result of functioning as pseudo gaps.

According to an aspect of the invention, a magnetic head comprises a pair of magnetic core halves opposed to each other through a non-magnetic material to form a magnetic gap, and it further comprises ferromagnetic thin films. The pair of magnetic core halves are made of a ferromagnetic oxide and have gap forming faces to be opposed to each other for forming the magnetic gap. The gap forming faces have an appearance exposing a grown crystal of the ferromagnetic oxide. The ferromagnetic thin films are made on the respective gap forming faces and they are made of a ferromagnetic metal material. Preferably, the gap forming faces are etched and then purified by reverse sputtering, whereby the grown crystal of the ferromagnetic oxide is exposed on those faces.

In a preferred embodiment of the invention, the magnetic head further comprises heat-resistant thin films made of a material having heat resistance and interposed between the gap forming faces and the ferromagnetic thin films. Preferably, each heat-resistant thin films have a thickness of 1 nm or more, and 1/10 or less of a length of the magnetic gap. More preferably, each heat-resistant thin films have a thickness of 2 nm or more, and 1/20 or less of a length of the magnetic gap. The material of the heat-resistant thin films may include $SiO_2$ and the metal material of the ferromagnetic thin films may include sendust. The oxide of the magnetic core halves may include ferrite. A surface roughness degree of the gap forming faces, i.e., a level difference on those surfaces is preferably less than ten times the thickness of each heat-resistant thin film.

According to another aspect of the invention, a magnetic head comprises a pair of magnetic core halves, heat-resistant thin films and ferromagnetic thin films, the pair of magnetic core halves being opposed to each other through a non-magnetic material to form a magnetic gap. The pair of magnetic core halves are made of a ferromagnetic oxide and have gap forming faces to be opposed to each other for forming the magnetic gap. The gap forming faces are purified at least by etching. The heat-resistant thin films are formed on the gap forming faces and those thin films are made of a material having heat resistance. The ferromagnetic thin films are formed on the corresponding heat-resistant thin films and they are made of a ferromagnetic metal material.

A method of manufacturing a magnetic head according to an aspect of the invention is a method of manufacturing a magnetic head including a pair of magnetic core halves opposed to each other through a non-magnetic material to form a magnetic gap. In this manufacturing method, first, members of magnetic core halves are prepared. The members of the magnetic core halves are made of a ferromagnetic oxide and have gap forming faces to be opposed to each other for forming a magnetic gap. The gap forming faces are treated to have an appearance exposing the grown crystal of the ferromagnetic oxide. Ferromagnetic thin films of a ferromagnetic material are formed on the thus treated surfaces. Preferably, the gap forming faces are treated by etching and reverse sputtering using inert gas ions.

In a preferred embodiment of the invention, the manufacturing method further comprises forming heat-resistant thin films of a material having heat resistance, interposed between the gap forming surfaces and the ferromagnetic thin films. The etching for treating the gap forming faces is preferably applied by immersion of the members of the magnetic core halves in a phosphoric acid solution. The heat-resistant thin films and the ferromagnetic thin films are formed preferably by sputtering.

In a method of manufacturing a magnetic head according to another aspect of the invention, members of magnetic core halves are prepared first. The members of the magnetic core halves are made of a ferromagnetic oxide and have gap forming faces to be opposed to each other for forming the gap. Then, the gap forming faces are etched. Heat-resistant thin films of a material having heat resistance are formed on the thus etched faces. After that, ferromagnetic thin films of a ferromagnetic metal material are formed on the heat-resistant thin films.

In a magnetic head according to one of the aspects of the invention, a grown state of a crystal of ferromagnetic oxide is exposed on the gap forming faces of the magnetic core halves. Thus, any layer portions adversely affected by treating processes or any impurity atoms, which would cause generation of pseudo gaps, are completely removed from the boundary regions between the magnetic core halves and the ferromagnetic metal thin films on the gap forming faces. Consequently, non-magnetic material is not interposed in the boundary regions between the magnetic core halves and the ferromagnetic metal thin films and those boundary regions never function as pseudo gaps. Therefore, degradation of a reproduced output of the magnetic head due to pseudo gaps can be prevented.

Preferably, the magnetic head of the invention further comprises heat-resistant thin films of a material having heat resistance, interposed between the gap forming faces and the ferromagnetic thin films. The heat-resistant thin films are chemically and thermodynamically stable. Since the heat-resistant thin films have a crystal structure similar to that of a glass material, those films never react with the magnetic core halves or the ferromagnetic metal thin films and never cause disturbance to the crystal structure of the environmental materials even at a high temperature. More specifically, if the thickness of each heat-resistant thin film between the corresponding gap forming face of the magnetic core half and the ferromagnetic thin film is sufficiently small, the length of a pseudo gap at an interface between the magnetic core half and the ferromagnetic thin film can be made considerably small. Accordingly, it is made possible to effectively suppress degradation of a reproduced output of the magnetic head due to the pseudo gap.

If the heat-resistant thin films are formed between the gap forming faces of the magnetic core halves and the ferromagnetic thin films, the heat-resistant thin films serve to suppress degradation of the reproduced output of the magnetic head due to generation of pseudo gaps insofar as the gap forming faces are purified at least by etching. In addition, if the gap forming faces of the magnetic core halves where the heat-resistant thin films are to be formed are purified by etching and reverse sputtering to expose a grown state of a crystal of the ferromagnetic oxide, the heat-resistant thin films are formed on the gap forming faces where any layer portions adversely affected by the treatment and any impurity atoms causing generation of pseudo gaps as described above have been completely removed. As a result, generation of pseudo gaps can be effectively suppressed and there is little degradation of the reproduced output of the magnetic head.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 10A, 10B, 10C and 10D are schematic illustrations showing successive steps for treatment of a gap forming face of a magnetic core half.

FIGS. 14A, 14B, 15A, 15B, 16, 17A, 17B and 18 are perspective and sectional views showing, in a concrete manner, successive steps in a method of manufacturing a magnetic head according to an embodiment of the invention.

DESCRIPTION OF THE PREFERRED EMBODIMENTS

An embodiment of the present invention will be described in detail with reference to the drawings.

Figure 5:
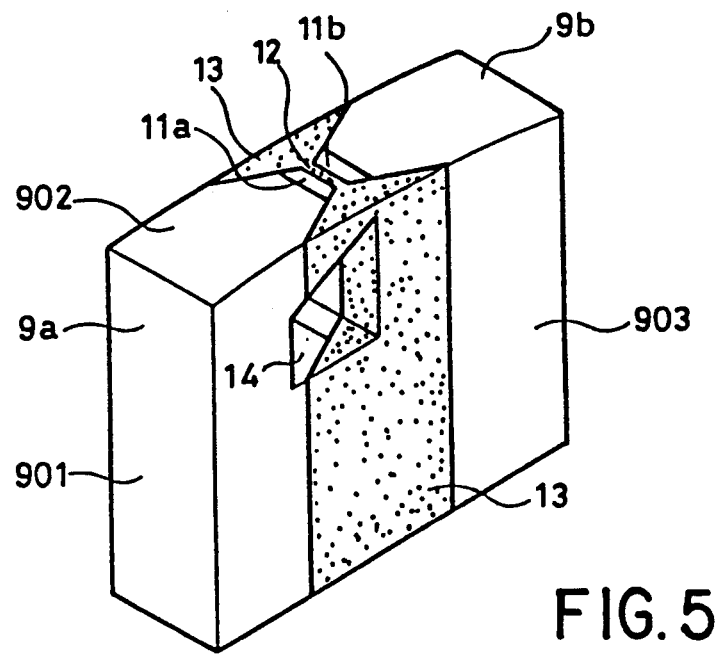
FIG. 5 is a perspective view showing an appearance of a magnetic head according to an aspect of the invention.

FIG. 5 is a perspective view showing an appearance of a magnetic head according to an aspect of the present invention. Thin films 11a and 11b of a ferromagnetic metal such as sendust alloy, permalloy alloy, Fe-Al alloy, Fe-Co alloy, Fe-Si alloy, Fe-C alloy, or metal-metal or metal-metalloid amorphous alloy are formed by sputtering on gap forming faces of magnetic core halves 9a and 9b, respectively, made of a ferromagnetic oxide such as single crystal or polycrystal ferrite of Mn-Zn, single crystal or polycrystal ferrite of Ni-Zn, or Ferroxplana. The gap forming faces of the magnetic core halves 9a and 9b have been etched and purified by reverse sputtering, whereby the grown state of the crystal of the ferromagnetic oxide is exposed on those faces. The thin films 11a and 11b of the ferromagnetic metal are formed on those gap forming faces. A magnetic gap 12 located between the ferromagnetic metal thin films 11a and 11b is made of a non-magnetic material such as $SiO_2$, $TiO_2$, $Al_2O_3$, $Ta_2O_5$, Ti or Cr. The magnetic core halves 9a and 9b are joined through glass 13. A coil groove 14 is formed in the magnetic core halves 9a and 9b joined through the glass 13.

Figure 6:
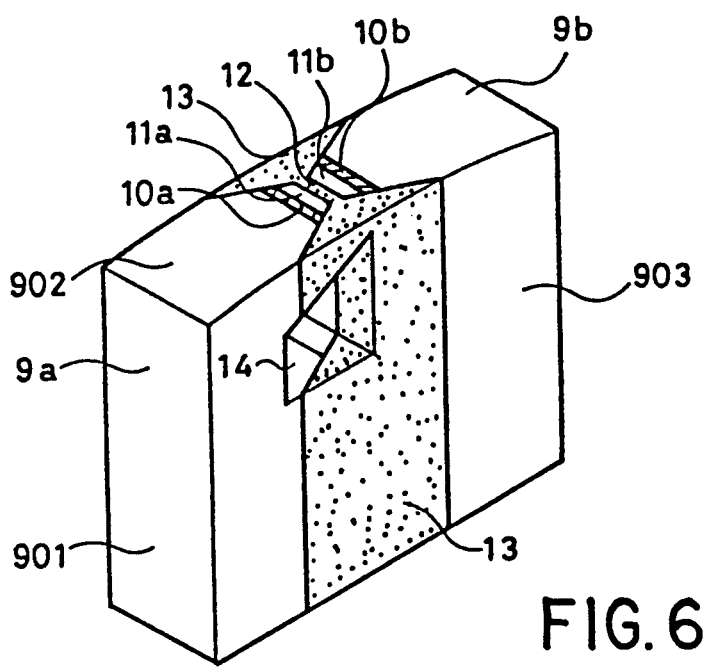
FIG. 6 is a perspective view showing an appearance of a magnetic head according to another aspect of the invention.
Figure 7A:
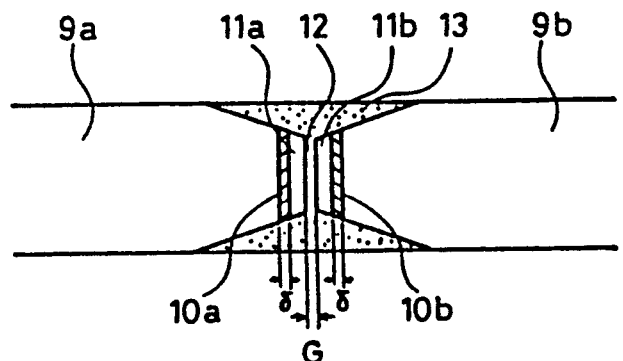
FIG. 7A is a plan view showing a tape contact surface of the magnetic head of FIG. 6.

FIG. 6 is a perspective view showing an appearance of a magnetic head according to another aspect of the invention and FIG. 7A is a plan view showing a tape contact surface of the magnetic head shown in FIG. 6. In those figures, thin films 11a and 11b of a ferromagnetic metal are formed by sputtering on the gap forming faces of the magnetic core halves 9a and 9b through heat-resistant thin films 10a and 10b, respectively. Those heat-resistant thin films 10a and 10b are made of a chemically stable high-melting metal or an oxide where binding with oxygen is hardly changed by a temperature change. For example, those heat-resistant thin films 10a and 10b are made of a high-melting metal such as Ti, Cr, Mo, W or Pt, or a heat-resistant oxide such as $SiO_2$, $TiO_2$, $ZrO_2$, $Al_2O_3$, $Y_2O_3$, $Ta_2O_5$, $V_2O_5$, MgO or CaO. Although an oxide of an element A is expressed as $A_xB_y$ typically by a stoichiometric composition ratio, the ratio of x:y is not always a simple integral ratio. Taking account of this, an oxide in the present specification is expressed by chemical symbols of a stoichiometric composition ratio according to the conventional manner. In this case, the gap forming faces on which the heat-resistant thin films 10a and 10b are to be provided may be purified at least by etching, or by reverse sputtering after the etching, whereby the grown state of the crystal of the ferromagnetic oxide of the magnetic core halves 9a and 9b is exposed on those faces. Preferably, the thickness t of each of the ferromagnetic metal thin films 11a and 11b is 1 to 10 μm, the length G of the magnetic gap 12 is 0.1 to 1 μm, and the thickness δ of each of the heat-resistant thin films 10a and 10b is more than 1 nm and less than G/10. Other materials than the heat-resistant thin films 10a and 10b of the magnetic head shown in FIG. 6 are the same as those in the magnetic head shown in FIG. 5.

Figure 7B:
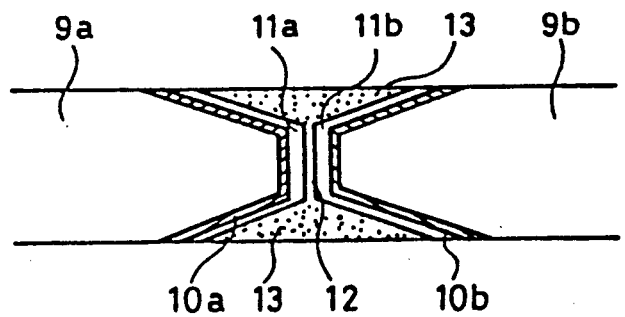
FIGS. 7B, 7C, 7D, 7E, 7F, 7G and 7H are plan views showing tape contact surfaces of magnetic heads according to other embodiments of the invention.
Figure 7C:
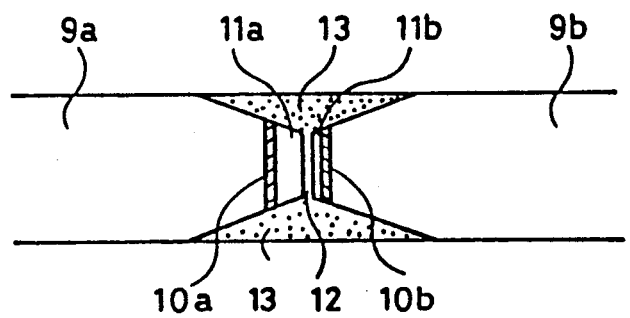
Figure 7D:
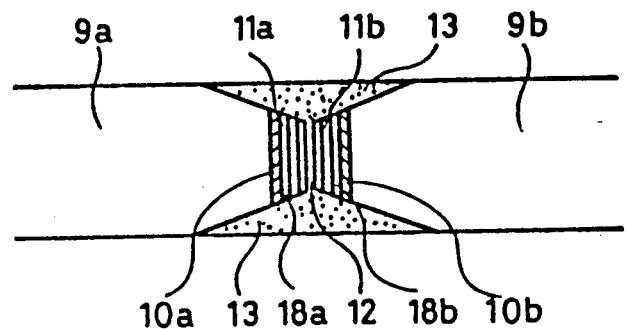
Figure 7E:
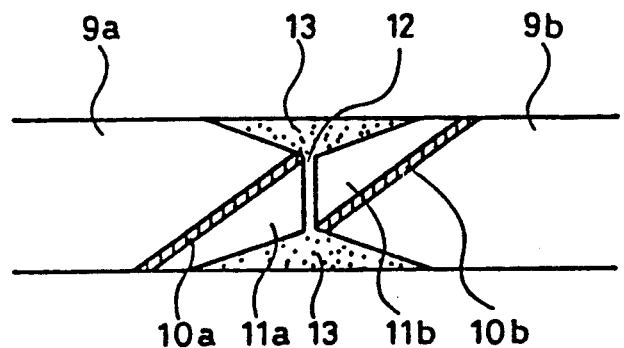
Figure 7F:
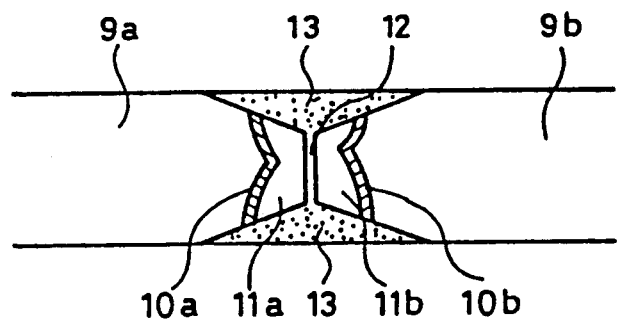
Figure 7G:
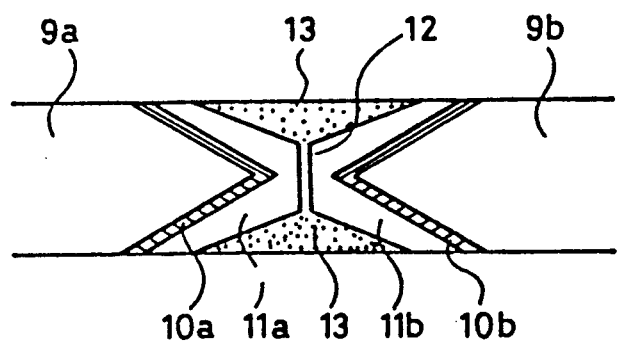
Figure 7H:
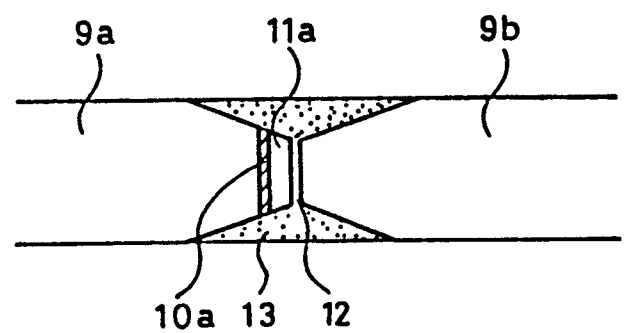

In addition, the present invention is applicable not only to the magnetic head having the tape contact surface as shown in FIG. 7A but also to a magnetic head as shown in FIG. 7B, for example, which is obtained by the steps of forming a track width defining groove and then depositing heat-resistant thin films 10a and 10b and ferromagnetic metal thin films 11a and 11b. Further, the present invention is also applicable to a magnetic head having ferromagnetic metal thin films 11a and 11b of different thicknesses as shown in FIG. 7C, or a magnetic head having a laminated structure including ferromagnetic metal thin films 11a and 11b and insulator layers 18a and 18b as shown in FIG. 7D. The present invention is also applicable to magnetic heads as shown in FIGS. 7E to 7G, each of which has a tapered contact surface where junction faces between the magnetic core halves 9a and 9b and the ferromagnetic metal thin films 11a and 11b, respectively, are not parallel to the faces forming the magnetic gap 12. The present invention is also applicable to a variation of FIG. 7C, where a ferromagnetic metal thin film is formed only on one of the magnetic core halves as shown in FIG. 7H.

Now, a method of manufacturing a magnetic head according to an embodiment of the present invention will be described.

Figure 8A:
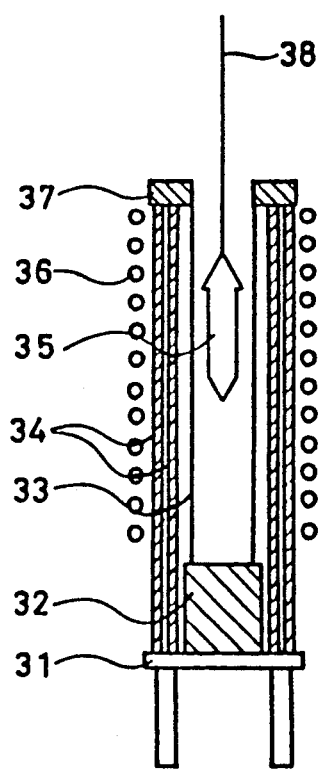
FIG. 8A is a sectional view showing a furnace used for forming a single crystal of ferrite as the material of magnetic core half members and FIG. 8B is a graph showing a temperature distribution in the furnace.
Figure 8B:
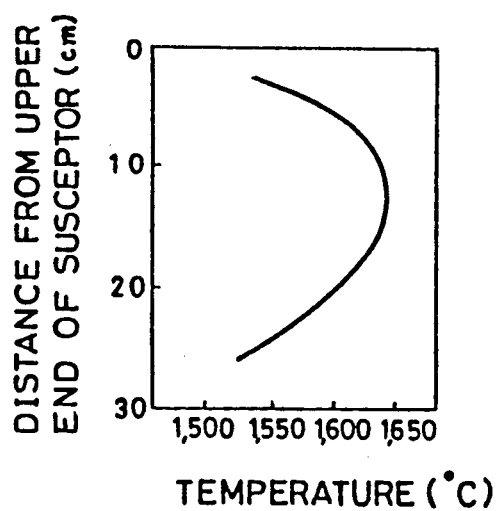

First, single crystal Mn-Zn ferrite for example is made as the material of the magnetic core halves for use in the magnetic head of the present invention. The method of making such single crystal ferrite is as follows. MnO powder, ZnO powder and $Fe_2O_3$ powder are mixed and pressed to have a given shape. Then, the pressed materials are sintered in a nitrogen atmosphere at a temperature of about 1400° C., whereby polycrystal ferrite having a spinel structure is prepared. The polycrystal ferrite contains lattice defects in crystal grains or voids at crystal grain boundaries and accordingly it is necessary to apply a high temperature pressurizing process such as a hot press process or an HIP process even if the ferrite of the polycrystal form is used as the material of the magnetic head. Subsequently, the polycrystal ferrite thus obtained is crushed and put in a pointed crucible of platinum. As shown in FIG. 8A, the platinum crucible 35 is set in a furnace of a vertical type and the ferrite in the platinum crucible 35 is entirely melted at a temperature of about 1650° C. The vertical type furnace used in this case has a construction as described below. An alumina support 32 is placed on a stainless base 31. The outer wall of the surface is formed by a heat reserving tube 34 of alumina and work coils 36 are wound around the outer surface thereof. A susceptor 33 is provided inside the heat reserving tube 34 of alumina and the platinum crucible 35 is suspended inside the susceptor 33 by a suspension wire 38. A temperature distribution in the susceptor 33 is as shown in FIG. 8B. After the ferrite has been entirely melted in the vertical type furnace, the platinum crucible 35 is caused to fall at a speed of 2 to 10 mm/hour. Solidification of ferrite progresses from the region around the top of the platinum crucible 35 according to the movement of the crucible 35, so that a single crystal is grown. On that occasion, if a single crystal seed having a desired crystal orientation has been put in the top of the platinum crucible 35, the growth orientation of the single crystal can be controlled. The crystal orientation of the single crystal thus obtained is measured by X ray diffraction of the Raue method and the single crystal is cut so that wafers having a desired orientation can be obtained as the material of the magnetic head.

Figure 9:
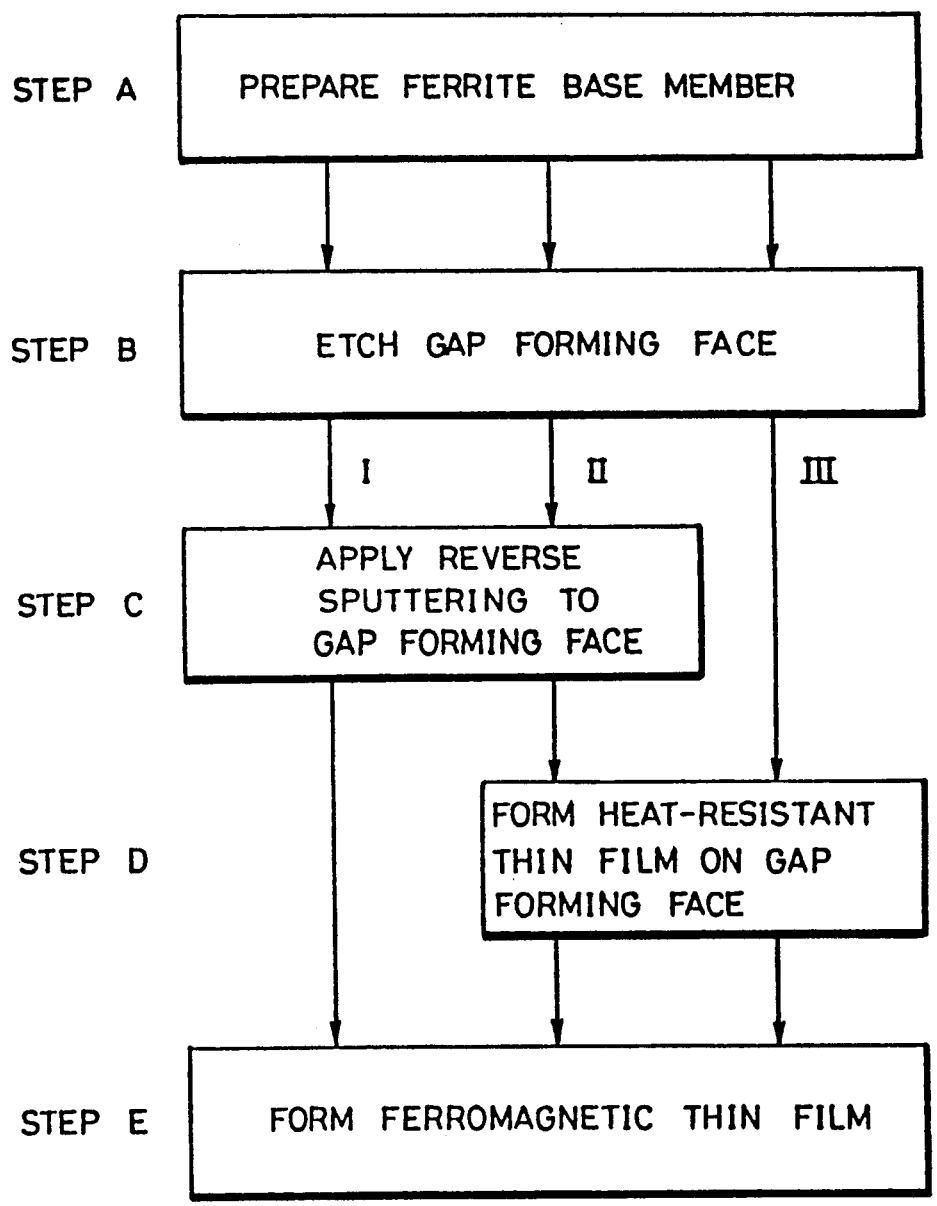
FIG. 9 is a schematic process chart showing successive steps for treatment of gap forming faces of magnetic core halves used in a magnetic head according to the present invention.

A gap forming face of each base member made of single crystal Mn-Zn ferrite thus obtained is subjected to the below described treatments according to the present invention. FIG. 9 is a process chart showing successive steps of treatment of the gap forming face of the ferrite base member.

Referring to FIG. 9, first, a base member of single crystal Mn-Zn ferrite is prepared (in the step A). An upper surface of the ferrite base member, to be a gap forming face, is treated to have a mirror surface by using abrasive grains of diamond or the like and then an upper layer region adversely affected by the treatment in the base member is removed by etching using phosphoric acid solution or the like (in the step B). After that, the ferrite base member having the etched surface as the gap forming face is placed in a high-vacuum sputtering apparatus and the gap forming face is subjected to reverse sputtering using $Ar^+$ ions generated by glow discharge, so that impurities adhered on the upper surface of the ferrite base member are removed (in the step C). Then, according to the sequence shown by II of FIG. 9, a heat-resistant thin film such as $SiO_2$ is formed on the gap forming face of the ferrite base member by sputtering, evaporation or the like (in the step D). A thin film of ferromagnetic metal such as sendust is formed on the heat-resistant thin film by sputtering (in the step E). According to an aspect of the present invention, the sequence shown by I of FIG. 9 may be adopted to apply reverse sputtering to the gap forming face and then to form a ferromagnetic thin film thereon. According to another aspect of the invention, the sequence shown by III of FIG. 9 may be adopted to form a heat-resistant thin film after the etching of the gap forming face and to form a ferromagnetic thin film thereon.

In the following, the method of manufacturing a magnetic head of the present invention will be described according to the sequence shown by II of FIG. 9.

First, the treatment in the step B of FIG. 9 will be described in detail. Mirror-surface treatment is applied to an upper surface of the single crystal Mn-Zn ferrite prepared as described previously. As a result, the upper surface of the ferrite base member 27 has a layer region 29 adversely affected by the treatment on a perfect crystal layer 28 of the spinel structure. This adversely affected layer 29 comprises an amorphous region, a distorted region and a bulk region. Impurity atoms 20 such as H, O, C or N are absorbed on the upper surface of the adversely affected layer 29, that is, the surface of the ferrite base member 27. The magnetic property of the adversely affected layer 29 is deteriorated compared with that of the perfect crystal layer 28.

Next, the ferrite base member 27 is immersed in phosphorous acid solution at 40° C. for 30 minutes and etched by a thickness 1.5 μm, whereby the adversely affected layer 29 and the impurity atoms 20 are completely removed. If the ferrite base member 27 is immersed in phosphoric acid solution at temperature of 80° C., etching of 1.5 μm can be done for 1.5 minute. If the temperature of the phosphoric acid solution is lower than 40° C., a long period of time is required for achieving the prescribed etching. If it is higher than 80° C., it becomes difficult to remove the phosphoric acid in the subsequent step. The perfect crystal surface of the ferrite base member 27 after the etching can be ascertained by electronic ray diffraction. Although the adversely affected layer 29 and the impurity atoms 20 can be removed by using nitric acid or hydrochloric acid other than phosphorus acid, the surface of the ferrite base member 27 is unavoidably caused to have unevenness in such a case and therefore use of nitric acid or hydrochloric acid is not preferred.

In the above described step of etching, the minimum value of the thickness to be etched is limited to a value permitting removal of the layer 29 adversely affected by the mirror-surface treatment in the preceding step and the maximum value thereof is limited to a value not causing the surface roughness to be increased by the etching.

The crystal orientation of single crystal Mn-Zn ferrite used as the magnetic core half material is as follows. Referring to FIGS. 5 and 6, the face 901 is a {100} face, the face 902 is a {110} face and the face 903 is a {110} face. Alternatively, the face 901 is a {111} face, the face 902 is a {112} face and the face 903 is a {110} face. Thus, the gap forming faces of the magnetic core halves 9a and 9b are the {100} faces or the {111} faces. Accordingly, the etching process applied according to the present invention will be specifically described with regard to the polishing and etching steps on those {100} and {111} faces.

Figure 11A:
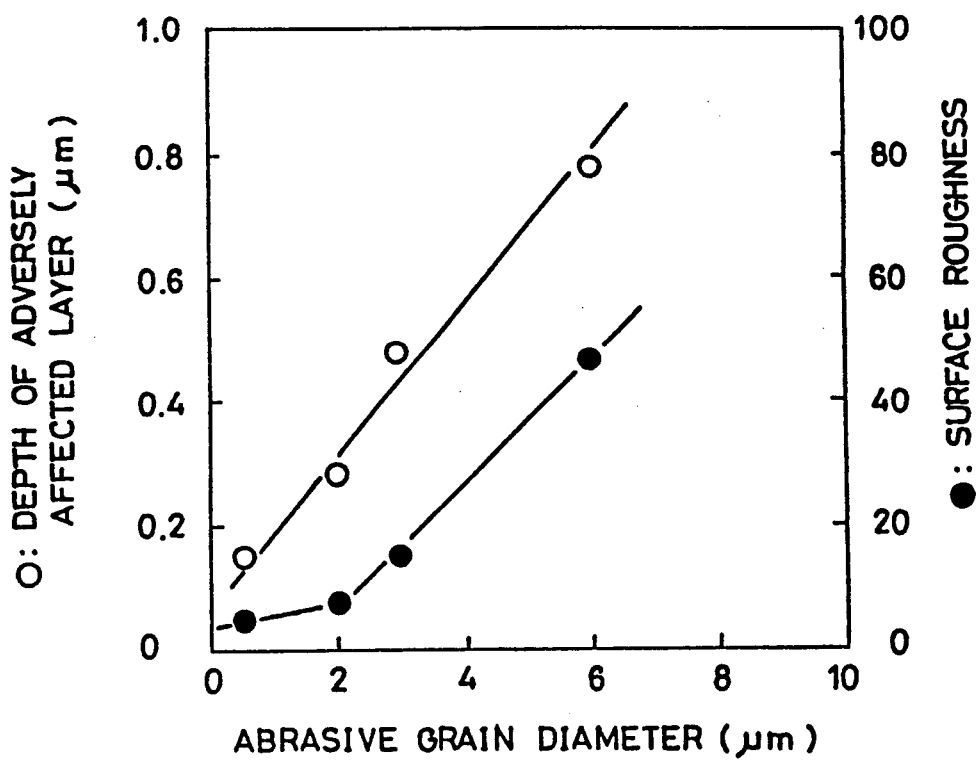
FIG. 11A is a graph showing a dependency, on abrasive grain diameter, of a depth of a layer portion adversely affected by polishing of a single crystal of ferrite as the magnetic core half material as well as a dependency of surface roughness on abrasive grain diameter.

If a {100} face of single crystal Mn-Zn ferrite is polished by using abrasive grains of diamond on a tin plate, dependencies of the depth of the adversely affected layer and the surface roughness on the abrasive grain diameter are shown in FIG. 11A. The dependencies of the depth of the adversely affected layer and the surface roughness on the abrasive grain diameter are substantially the same as in the case of the {111} face. The depth of the adversely affected layer in this figure is a depth of etching applied until a perfect crystal face appears by observation of a Kikuchi line pattern through electronic ray diffraction at the time of etching by high-density phosphoric acid in the polished surface. The surface roughness degree corresponds to a peak-to-peak value in the unevenness of the polished surface observed by a tracer level meter. In FIG. 11A, the depth of the adversely affected layer on a surface of an Mn-Zn ferrite wafer polished by using abrasive grains of diamond of 2 μm in diameter is 0.3 μm. Accordingly, the necessary thickness to be etched for removing the layer adversely affected by the polishing is 0.3 μm or more.

Figure 11B:
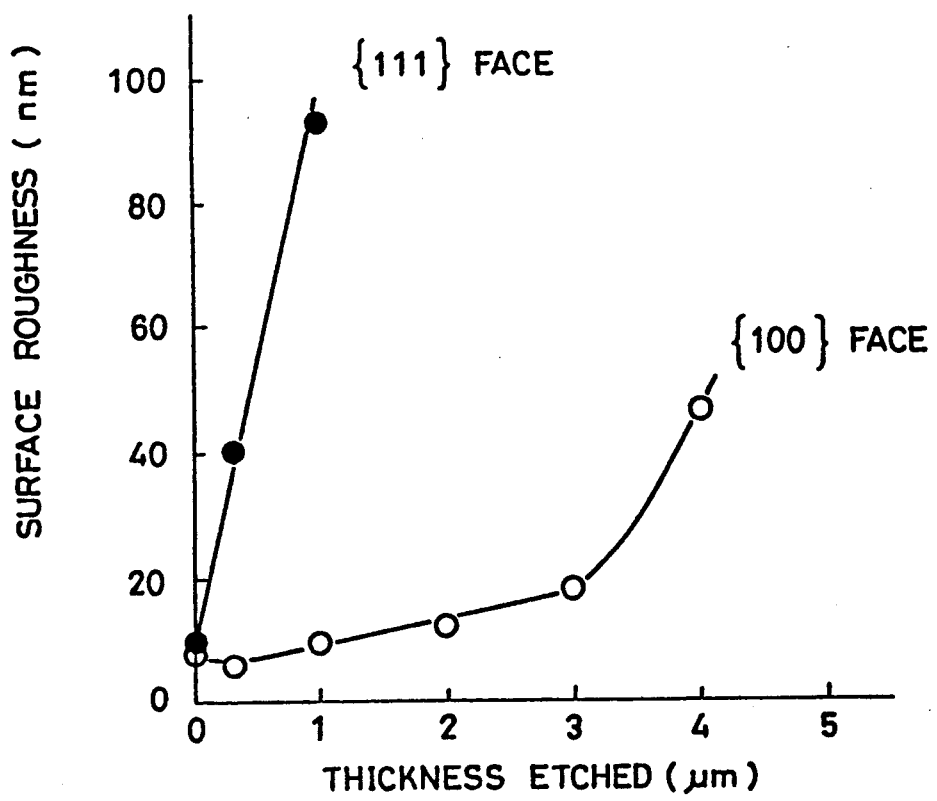
FIG. 11B is a graph showing a dependency, on an etching amount, of a surface roughness of a wafer of Mn-Zn ferrite as the magnetic core half member.

On the other hand, if the thickness to be etched is too large, the surface roughness degree of the ferrite wafer is increased. The dependency on the thickness to be etched of the surface roughness of the Mn-Zn ferrite wafer is shown in FIG. 11B. In this figure, the dependency of the surface roughness on the thickness to be etched differs considerably dependent on the crystal orientation of the ferrite base member to be etched, that is, whether it has the {100} face or the {111} face. If the surface roughness degree becomes so large that it cannot be covered with a heat-resistant thin film formed in the subsequent step, the meritorious effect of the heat-resistant thin film in the present invention is considered to be reduced. For example, in the case of the {111} face, the surface roughness degree is about 40 nm as shown in FIG. 11B if etching of about 0.3 μm is applied according to FIG. 11A to remove the layer adversely affected by the polishing using abrasive grains of diamond of 2 μm in diameter. When the surface roughness degree has such a large value, the meritorious effect of the heat-resistant thin film formed in the subsequent step is lessened.

Next, the ferrite base member 27 having the gap forming face thus etched is immersed in pure water, so that the phosphoric acid is completely removed. Then, it is cleaned by using 1-1-1-trichlor ethane, isopyl alcohol and acetone in this order. After that, the ferrite base member 27 is placed in a sputtering apparatus and exposed to a vacuum atmosphere. As a result, impurity atoms 22 such as H, O, N or C are absorbed on the surface of the ferrite base member 27 exposed to the atmosphere, as shown in FIG. 10B.

The reverse sputtering step (the step C) applied to the gap forming face of the ferrite base member thus treated will be hereinafter described in detail.

Figure 12:
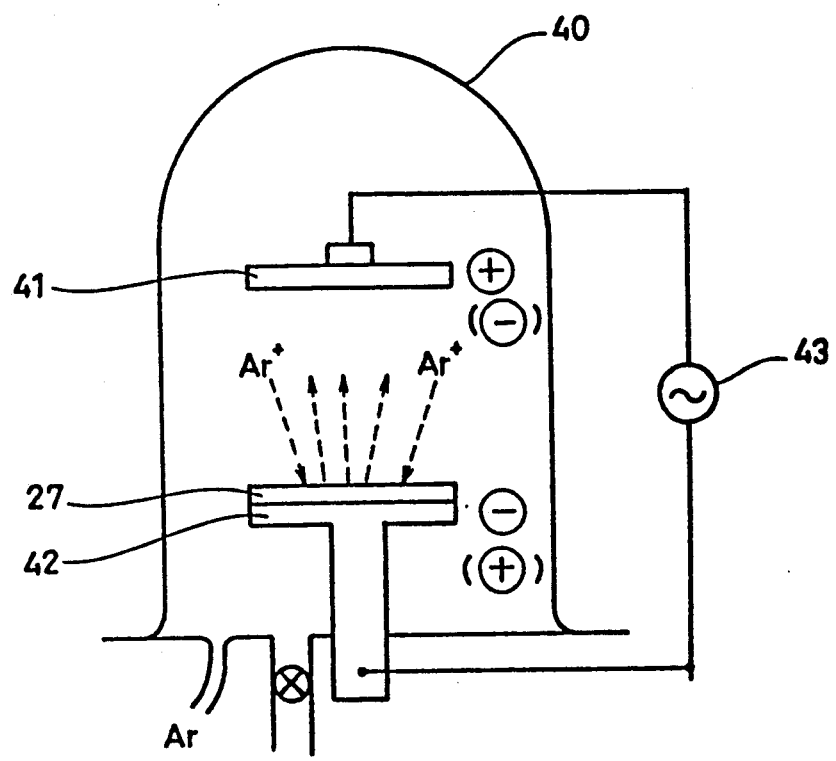
FIG. 12 is an illustration showing a sputtering apparatus to be used for reverse sputtering or sputtering in formation of films in a method of manufacturing a magnetic head according to the present invention.

A sputtering apparatus used for the reverse sputtering step is schematically illustrated in FIG. 12. Referring to FIG. 12, the ferrite base member 27 is placed on a second plate 42 set to a negative potential, while a first plate 41 is set to a positive potential. Inert gas such as Ar or He is introduced in a container 40 and electric power of high frequency is applied from an external AC power supply 43 to the first plate 41 and the second plate 42. The ferrite base member 27 thus placed in the sputtering apparatus is subjected to reverse sputtering for several tens of seconds to several tens of minutes by using inert gas ions 21a such as $Ar^+$ as shown in FIGS. 10C and 12, whereby the impurity atoms 22 are removed. At that time, a minus peak value of the high frequency voltage of 13.56 MHz applied to the ferrite base plate 27 in the reverse sputtering is adjusted through observation of negative voltage waveforms applied to the ferrite base member 27 by using a synchroscope, so that it is set to −200 V. If the minus peak value of the high frequency voltage applied to the ferrite base member 27 is −100 V or more, the impurity atoms 22 could not be removed. If it is less than −500 V, the crystallinity of the ferrite base member 27 would be damaged. Generally, a surface of a solid is unstable because of existence of non-saturated bonds as is different from the inside of crystal where bonds of corresponding atoms are bound to form saturated bonds and accordingly the surface of the solid is brought into a stable state by binding with gas molecules. The reverse sputtering step is applied for the purpose of removing the impurity atoms 22 absorbed on such occasion. Accordingly, the inert gas ions 21a need to have a sufficient energy to detach the thus bound impurity atoms 22 and constituent atoms 27a of the ferrite base member 27. On the other hand, the inert gas ions 21a should be prohibited from damaging the crystallinity of the surface of the ferrite base member 27, dispersing the constituent atoms 27a to outside or penetrating into the surface of the ferrite base member 27. In order to accomplish those objects, it is necessary to regulate high frequency voltage in the reverse sputtering process.

Figure 13:
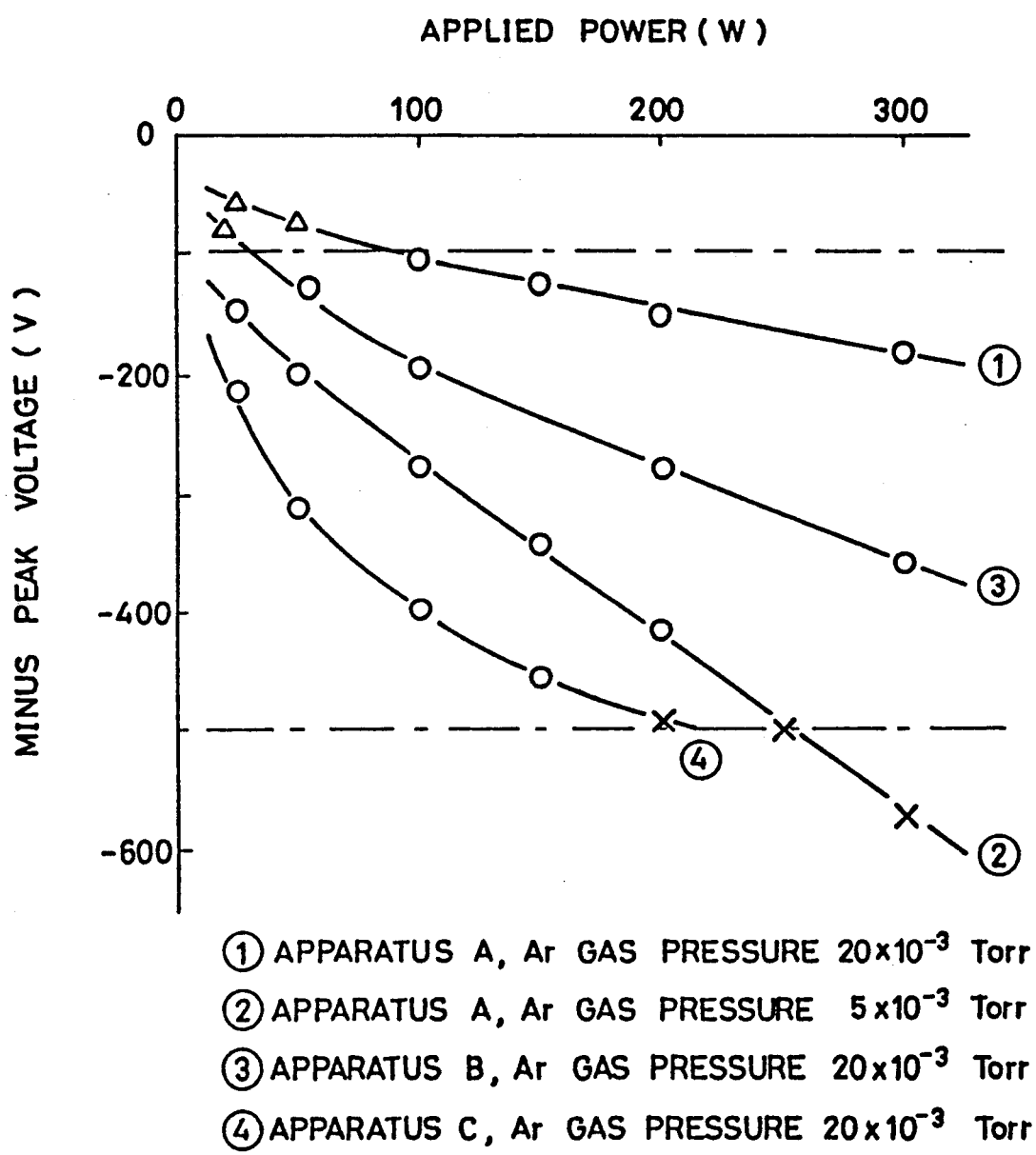
FIG. 13 is a graph showing a relation between electric power to be supplied in a reverse sputtering process and a minus peak voltage in a method of manufacturing a magnetic head according to the present invention.

In the following, description is made of regulation of high frequency voltage in the reverse sputtering. If electric power to be applied in the reverse sputtering is too small, the impurity atoms absorbed on the surface could not be removed in a satisfactory manner. If it is too large, the crystallinity of the surface of the ferrite wafer would be damaged. FIG. 13 shows dependency, on electric power to be applied, of minus peak values of high frequency voltage applied to the ferrite base member in the reverse sputtering process under various conditions. In FIG. 13, the marks X, Δ and ○ indicate the below described results observed for the ferrite base members subjected to the reverse sputtering under the respective conditions.

X: According to the observation of Kikuchi line patterns by electron ray diffraction, the crystallinity of ferrite base member was damaged.

Δ: Although the crystallinity of the ferrite base member was not damaged, removal of the impurities adhered was considered to be insufficient, because it was found that a waviness in frequency characteristics of a reproduced output was not reduced to less than 1 dB as a result of measurement of frequency characteristics using a magnetic head manufactured based on the ferrite base member.

○: The crystallinity of the ferrite member was not damaged and the impurities adhered were removed in a satisfactory manner.

From FIG. 13, it is understood that it is desirable to set a minus peak value of high frequency voltage in reverse sputtering within the range from −100 to −500 V.

Further, heat treatment (at 300° C. for 30 minutes) is applied to the ferrite base member 27 reverse-sputtered as described above, whereby inert gas molecules 21b having entered the ferrite base member 27 as shown in FIG. 10C in the reverse sputtering step are removed by degasification. Thus, the perfect crystal structure of the surface layer of the ferrite base member 27 is ensured and, as shown in FIG. 10D, the ferrite base member 27 has the surface having the perfect crystal structure and perfectly purified. Since the ferrite base member 27 is in the sputtering apparatus in the high vacuum atmosphere, no impurity atoms adhere to the non-saturated bonds of the constituent atoms 27a on the surface of the base member 27. However, this heat treatment may be dispensed with insofar as the high frequency voltage in the reverse sputtering step is regulated suitably and no inert gas penetrates into the surface of the ferrite base member 27.

Next, the step of forming a heat-resistant thin film on the gap forming face of the ferrite base member which has been subjected to the reverse sputtering as described previously (that is, the step D of FIG. 9) and the step of forming a ferromagnetic thin film thereon (that is, the step E of FIG. 9) will be described in detail.

The step of forming a heat-resistant thin film and the step of forming a ferromagnetic thin film are executed by sputtering. In those steps, the apparatus shown in FIG. 12 is used as a sputtering apparatus. The second plate 42 on which the ferrite base member 27 is placed is set to a positive potential and the first plate 41 opposed to the ferrite base member 27, where a target of a heat-resistant material or ferromagnetic metal material is placed, is set to a negative potential. A heat-resistant thin film of $SiO_2$ or the like is formed to have a thickness of about 5 nm by sputtering on the upper surface of the ferrite base member 27.

A thin film of ferromagnetic metal such as sendust is formed to have a thickness of about 4 μm by sputtering on the heat-resistant thin film and a non-magnetic thin film of $SiO_2$ or the like to form a magnetic gap is formed to have a thickness of about 0.1 μm on the ferromagnetic metal thin film.

The conditions for forming the ferromagnetic metal thin film are for example as follows. If a high-frequency magnetron sputtering apparatus is used, a ferrite wafer is disposed to face the target of sendust alloy and after the container 40 is evacuated to be in a high vacuum of $5 \times 10^{-6}$ Torr or less, radio frequency discharge is caused to occur with electric power 500 W in the atmosphere of Ar gas pressure of $5 \times 10^{-3}$ Torr, so that the film is formed by sputtering. Generally, it is considered to be necessary to apply heat treatment so that a sendust film formed by a sputtering method may have good soft magnetic characteristics. This heat treatment is applied in a glass melting process for joining the magnetic core halves in the method of manufacturing the magnetic head according to the present invention.

Thus, the treatment of the gap forming face of the ferrite base member shown in FIG. 9 is completed.

FIGS. 14A to 18 are perspective and sectional views showing successive steps of forming the magnetic head using the ferrite base members having the gap forming faces treated as described above.

Referring first to FIGS. 14A and 14B, magnetic core half members 9a and 9b are prepared. The magnetic core half members 9a and 9b are base members of single crystal Mn-Zn ferrite on which heat-resistant thin films 10a and 10b (not shown), ferromagnetic metal thin films 11a and 11b and non-magnetic thin films 12a and 12b of $SiO_2$ to be the magnetic gap, respectively, are formed in this order.

Next, referring to FIGS. 15A and 15B, track width defining grooves 16a, 16b, 16c and 16d are formed on the respective upper surfaces of the base members by ion beam etching or the like, whereby only regions 15a and 15b corresponding to the track width are left in the junction portions on those upper surfaces.

Further, referring to FIG. 16, grooves 13a and 13b to be filled with glass for junction of the magnetic core halves are formed on the respective upper surfaces of the base members by using a rotating grinding stone 17 or the like.

Figure 17A:
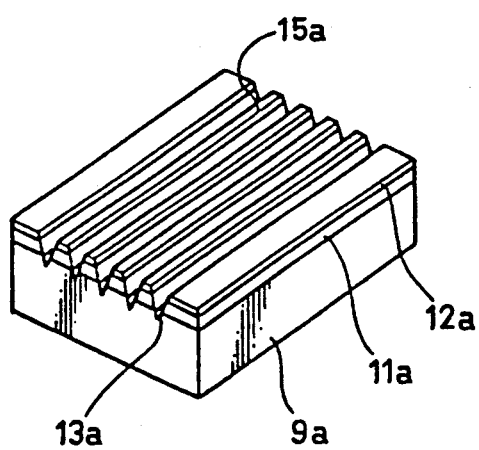
Figure 17B:
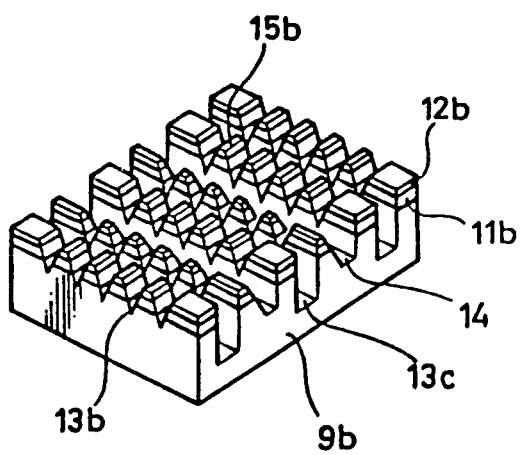

Referring to FIGS. 17A and 17B, the two base members formed by the above described steps are prepared and a coil groove 14 and a glass bar introduction groove 13c are formed in one of those base members. After that, the gap forming portions of the respective base members are joined opposed to each other and a glass bar is inserted in the glass bar introduction groove 13c and pressing and heating processes are applied. As a result, a block in which the base members are joined by the glass is obtained.

Figure 18:
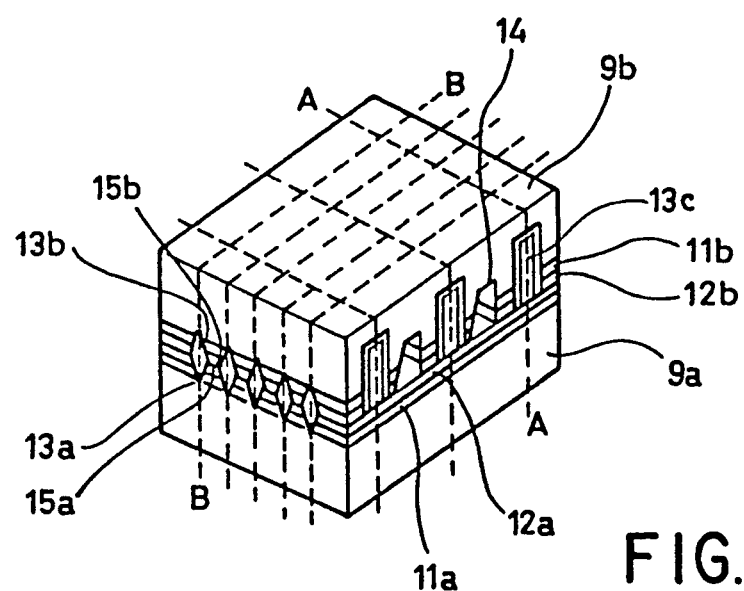

Thus, the block shown in FIG. 18 is obtained. This block is cut into core blocks along the line A—A. A tape contact face of each core block is polished to be a round surface and each core block is further cut along the line B—B, whereby magnetic head chips according to the present invention as shown in FIG. 5 or 6 are obtained.

Figure 1:
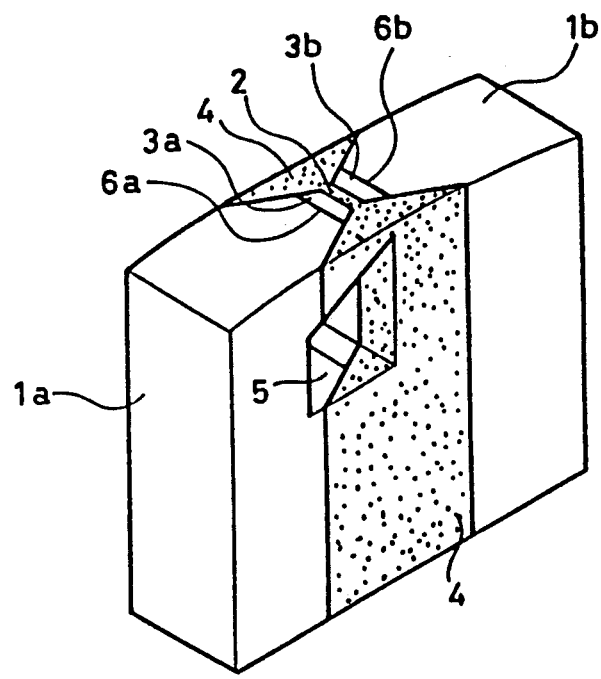
FIGS. 1 and 2 are perspective views showing appearances of conventional magnetic heads.
Figure 2:
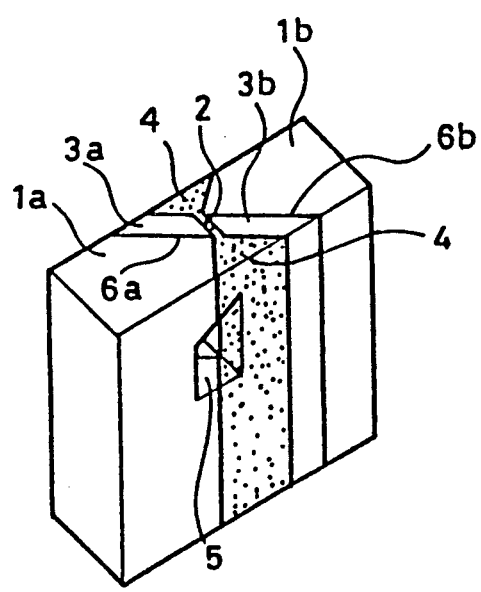
Figure 3:
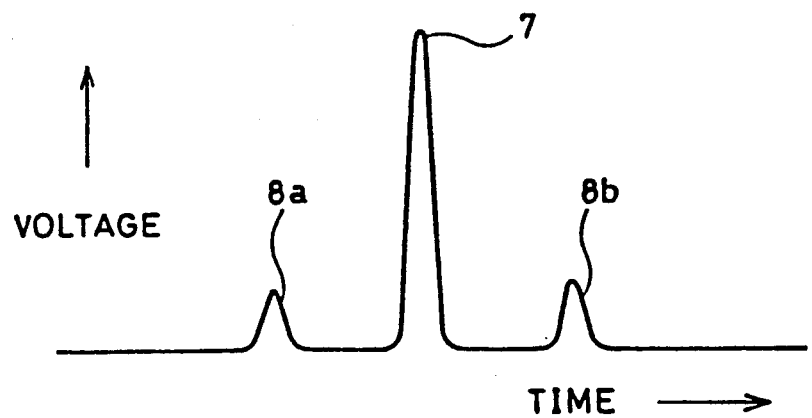
FIG. 3 is a diagram showing a reproduced signal through a magnetic gap and reproduced signals through pseudo gaps.

According to the above described method of forming the magnetic head (shown by the sequence I in FIG. 9), the ferromagnetic metal thin film is formed on the surface of the ferrite base member 27 of perfect crystal structure after the adversely affected layer 29, the non-magnetic impurity atoms 20 and 22, the inert gas molecules 21b and the like have been entirely removed. Accordingly, non-magnetic material does not exist in the boundary region between the ferrite base member 27 and the ferromagnetic metal thin film and this boundary region never functions as a pseudo gap. Consequently, deterioration of an output due to a pseudo gap can be effectively suppressed even in the case of a magnetic head of a type having the boundary faces 6a and 6b parallel to the magnetic gap 2 as shown in FIG. 1.

In addition, according to another method of manufacturing a magnetic head as described above (shown by the sequence II or III), the heat-resistant thin films 10a and 10b are chemically or thermodynamically stable and accordingly those films hardly react with the ferromagnetic metal thin films 11a and 11b or the magnetic core halves 9a and 9b even if they are subjected to a high temperature at the time of forming the ferromagnetic metal thin films 11a and 11b or joining the magnetic core half members by glass. If those heat-resistant thin films 10a and 10b are made of a heat-resistant material such as $SiO_2$, the crystal structure of the initial layers in forming the ferromagnetic metal thin films 11a and 11b is hardly affected by the crystal structure of the heat-resistant thin films 10a and 10b since those films 10a and 10b have the structure similar to that of glass. Accordingly, a length g of each of the pseudo gaps existing between the magnetic core halves 9a and 9b and the ferromagnetic metal thin films 11a and 11b, respectively, is never larger than a thickness δ of each of the heat resistant thin films 10a and 10b. In other words, if the thickness δ of each of the heat-resistant thin films 10a and 10b is set to a value sufficiently smaller than the length G of the magnetic gap 12, an output reproduced through the pseudo gaps can be set to a sufficiently small value compared with an output reproduced through the magnetic gap 12. The meritorious effect of the heat-resistant thin films 10a and 10b is achieved if the gap forming faces of the magnetic core halves 9a and 9b where those thin films are to be formed are purified at least by etching, and the above described effect is enhanced if the grown state of crystal of the ferromagnetic oxide is exposed on the gap forming faces after purification of reverse sputtering.

Now, the effect of preventing deterioration in a reproduced output in a magnetic head according to the present invention will be described with reference to a frequency characteristic curve.

Single crystal Mn-Zn ferrite wafers each having a {100} face as a gap forming face polished to have a mirror surface by using abrasive grains of diamond of 2 μm in diameter were used and the respective gap forming faces were treated under the conditions shown in table 1, whereby samples (a) to (e) were prepared. In table 1, the "sequence" represents the order of steps shown in FIG. 9. An $SiO_2$ film of 5 nm in thickness as the heat-resistant thin film and a sendust film of 3 μm in thickness as the ferromagnetic metal thin film were formed on the gap forming face of each sample. As for the sample (b), only the ferromagnetic metal thin film was formed. A layer of $SiO_2$ as a layer constituting a magnetic gap was formed to have a thickness of 0.1 μm. For each kind of sample thus obtained, two ferrite wafers were joined whereby a magnetic head was obtained. The length G of the magnetic gap of each magnetic head was 0.2 μm.

TABLE 1

| | Conditions Treatment conditions of gap forming face | | |
|---|---|---|---|
| Sample | Sequence | Thickness to be etched | Reverse sputtering |
| (a) | — | — | — |
| (b) | I | 1 μm | minus peak voltage −200 V |
| (c) | III | 1 μm | — |
| (d) | II | 1 μm | minus peak voltage −200 V |
| (e) | II | 1 μm | minus peak voltage −200 V |

A frequency characteristic curve of a reproduced output was measured by using each magnetic head thus prepared. The measurement of the frequency characteristic curve was effected in the following manner. A metal tape having coercive force Hc of about 14000 e was used and a frequency sweep signal of 0.1 to 10 MHz was recorded with the condition of a head-tape relative traveling speed v=3.1 m/s and then a reproduced output thereof was detected by using a spectrum analyzer.

Figure 19A:
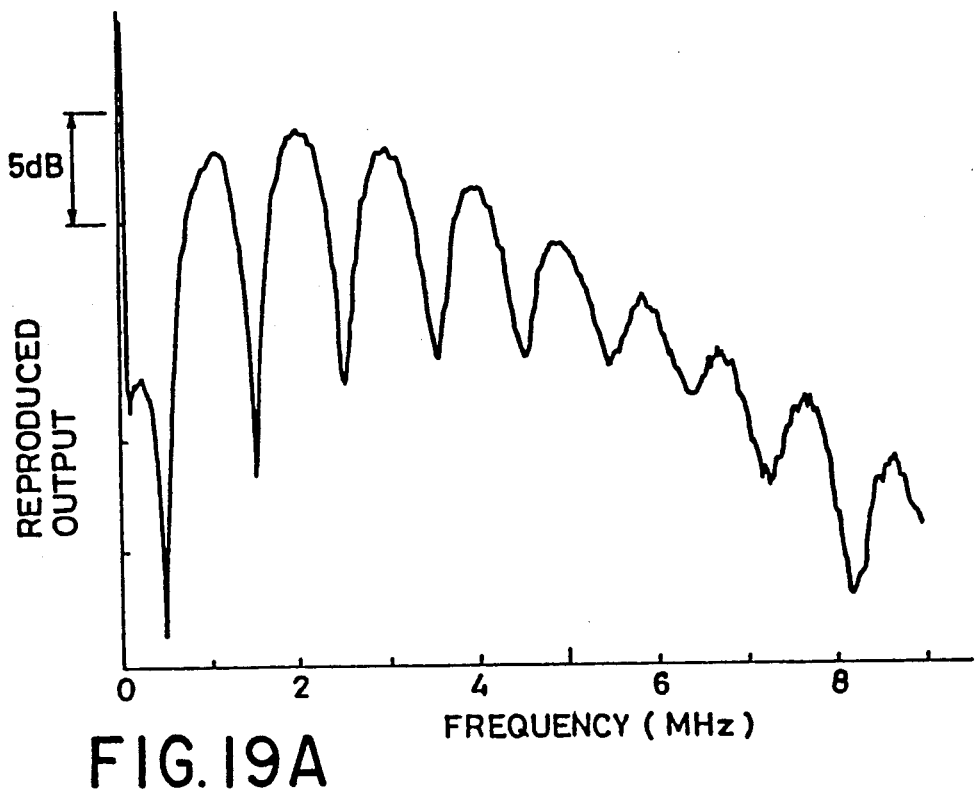
FIGS. 19A, 19B, 19C, 19D and 19E are graphs showing examples of frequency characteristic curves of reproduced outputs measured by using magnetic heads manufactured according to the present invention, as well as examples for comparison.
Figure 19B:
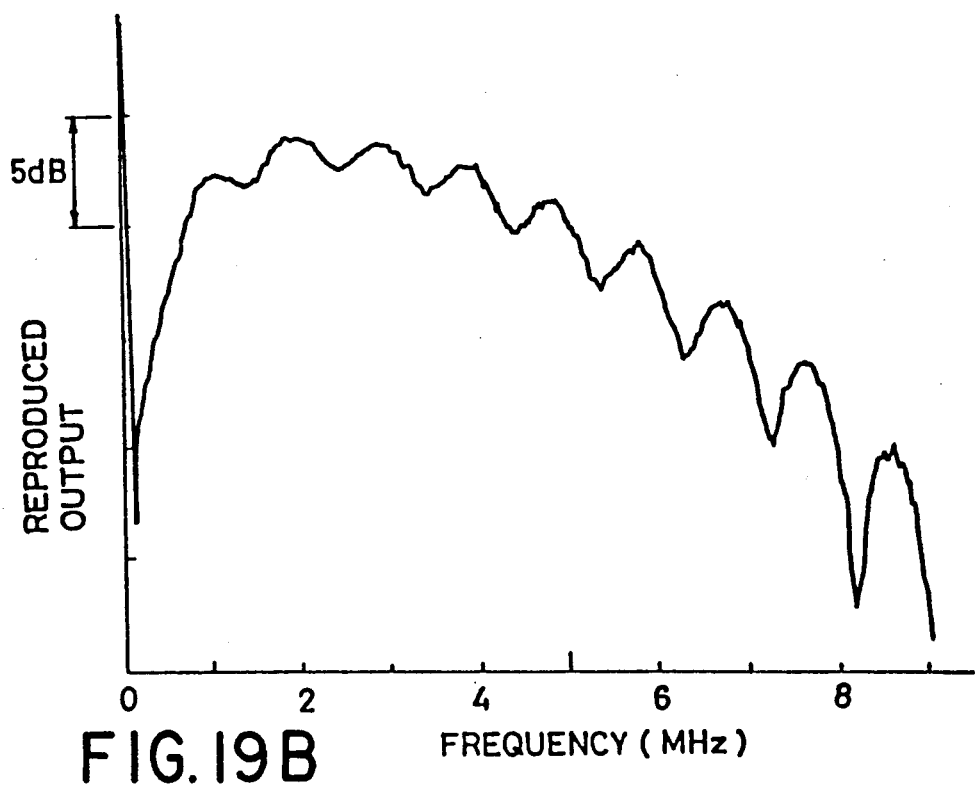
Figure 19C:
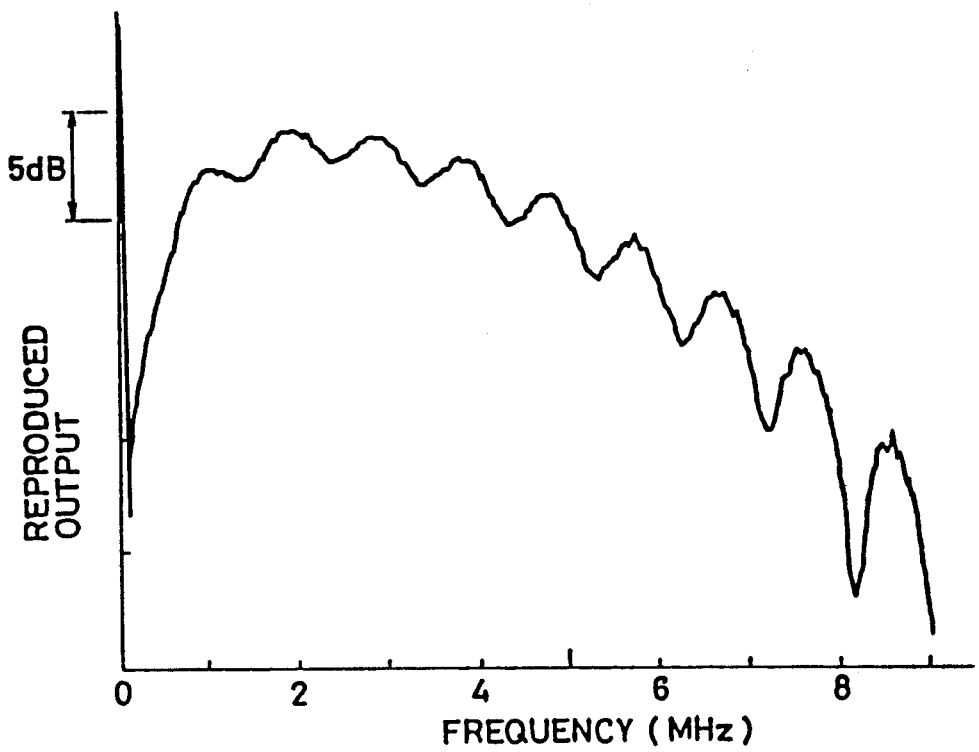
Figure 19D:
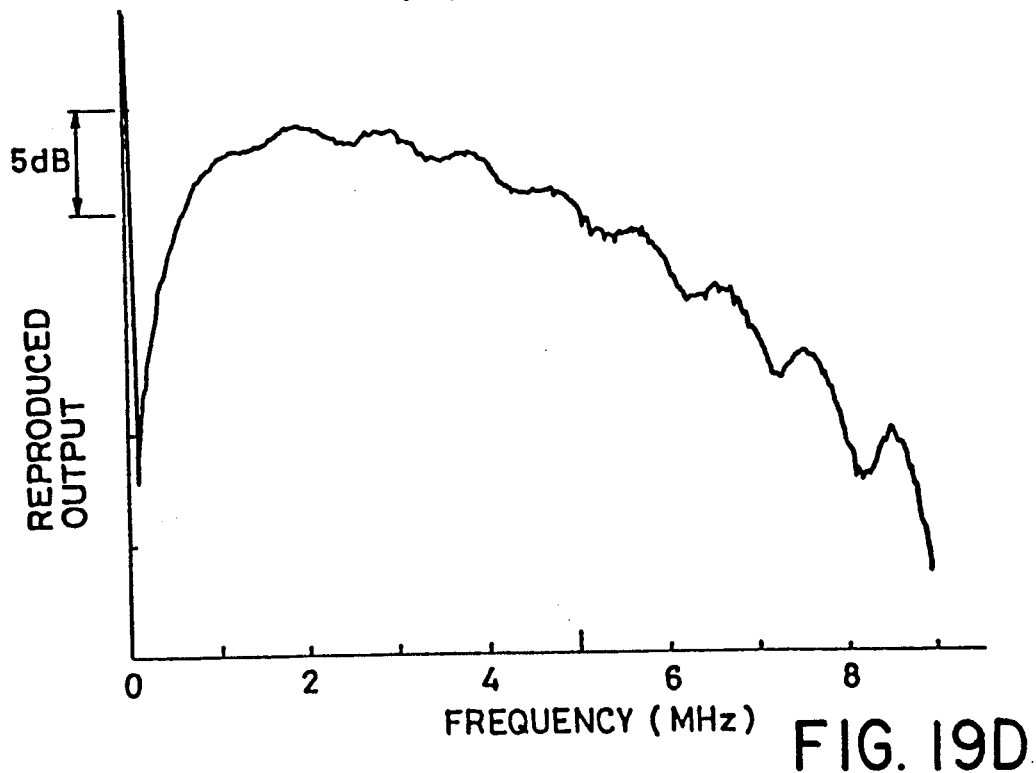
Figure 19E:
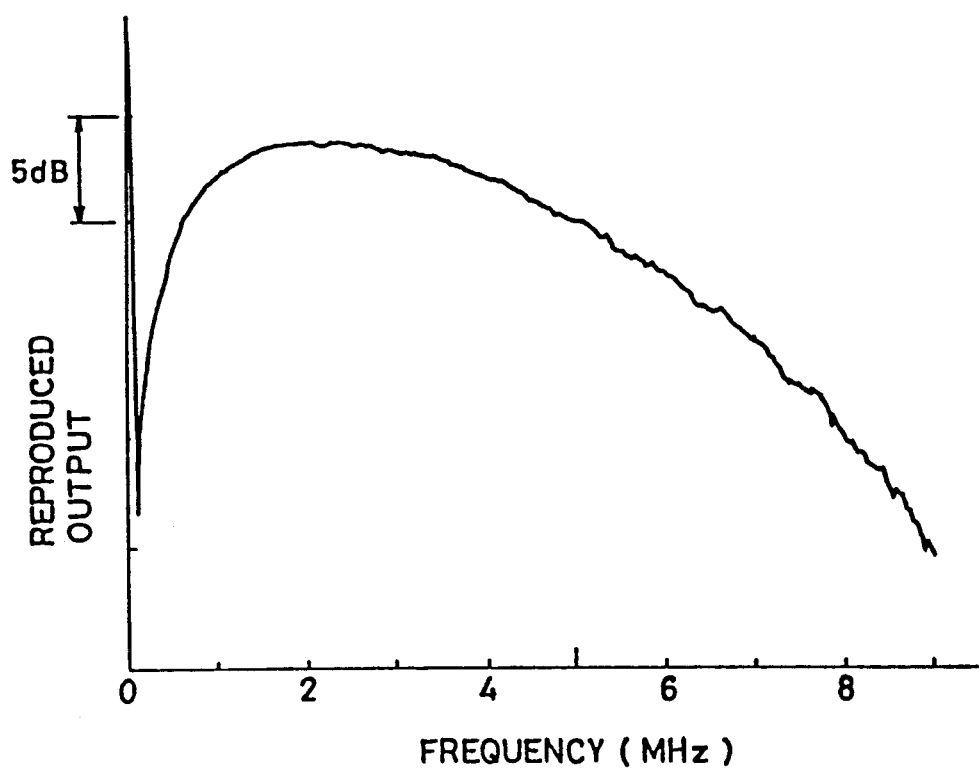

A waviness of the frequency characteristic of the reproduced output of each magnetic head thus measured is shown in FIGS. 19A to 19E. As can be seen from FIGS. 19B and 19C, the effect of making disappear waviness due to pseudo gaps is substantially the same for the magnetic head where only ferromagnetic metal thin films were formed on the gap forming faces treated by phosphoric acid etching and reverse sputtering, and the magnetic head where heat-resistant thin films and ferromagnetic metal thin films were formed on the gap forming faces treated only by phosphoric acid etching. In addition, according to FIGS. 19D and 19E, it is understood that the waviness degree of the reproduced output can be suppressed to about 1 dB or less. The frequency characteristic curves of the samples (d) and (e) are different as shown in FIGS. 19D and 19E irrespective of the same treatment conditions on the gap forming faces. It is understood that such difference corresponds to a difference in the variation ranges of the measured frequency characteristic curves. Therefore, it is believed that the heat-resistant thin films according to the present invention make it possible to at least ensure the frequency characteristic curve shown in FIG. 19D.

Further, magnetic heads were prepared by applying reverse sputtering to magnetic core halves having {100} faces of the roughness degree of 10 nm and magnetic core halves having {100} faces of the roughness degree of 50 nm after phosphoric acid etching and by forming thereafter heat-resistant thin films, ferromagnetic thin films and gap layers under the same conditions as described above. The frequency characteristic curves of the reproduced outputs of those two kinds of magnetic heads were measured. FIGS. 19D and 19C show the curves thus measured, in which the waviness degrees are about 0.5 dB and about 2 dB, respectively. In consequence, it is understood that the surface roughness degree of a gap forming face where a heat-resistant thin film is to be formed is preferably at least less than about ten times the thickness of the heat-resistant thin film.

Description is now made of a relation between the thickness δ of each of the heat-resistant thin films 10a and 10b and the magnitude of the output reproduced through a pseudo gap.

In general, the output reproduced through the magnetic gap 12 is substantially proportional to the gap length G if a wavelength λ recorded in a magnetic tape is about more than twice larger than the gap length G of the magnetic gap 12. In other words, if the film thickness δ of the heat resistant thin films 10a and 10b is 1/10 or less of the gap length G of the magnetic gap 12, a ratio N/S, i.e., a ratio between the reproduced output N through a pseudo gap and the reproduced output S through the magnetic gap 12 is less than about 1/10 (= −20 dB) and accordingly 2·N/S becomes less than 1/5 (= −14 dB), which value can be substantially disregarded, even if the pseudo gaps existing on both of the magnetic core halves 9a and 9b are taken into account. In addition, if the film thickness δ of the heat-resistant thin films 10a and 10b is 1/20 or less of the gap length G of the magnetic gap 12, 2·N/S becomes 1/10 (= −20 dB), which value is more preferable.

Figure 4:
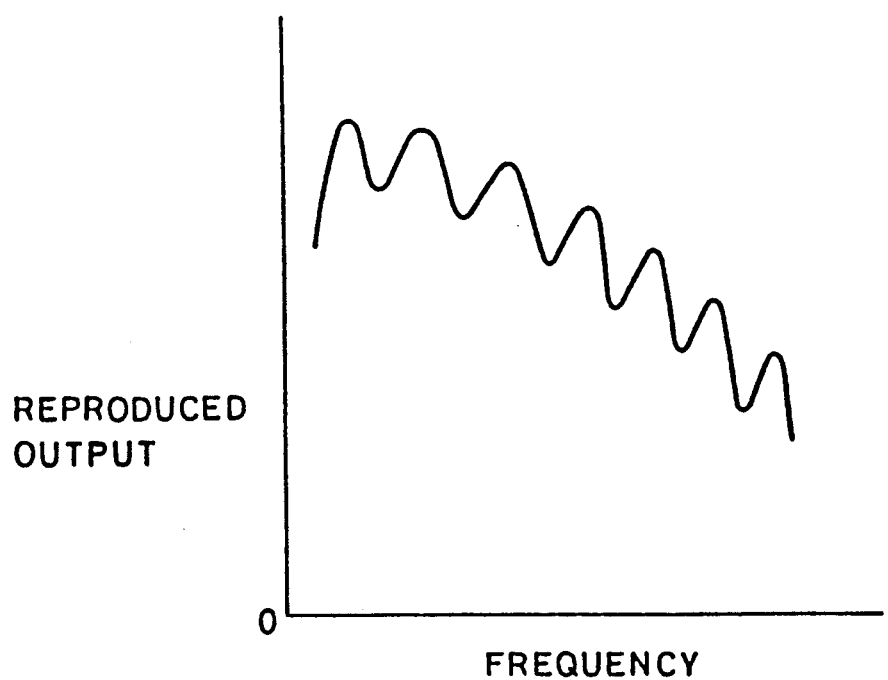
FIG. 4 is a graph showing frequency characteristics of an output by a conventional magnetic head.
Figure 20A:
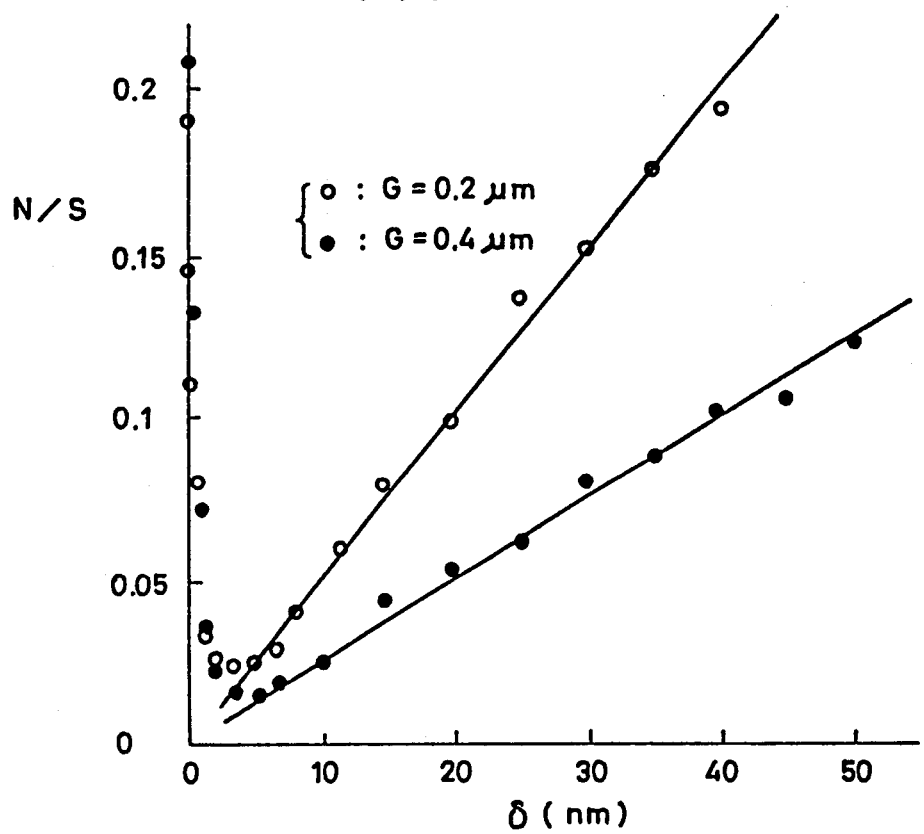
FIGS. 20A and 20B are graphs showing ratios between a reproduced output value through a magnetic gap and a reproduced output value through a pseudo gap with respect to a thickness value of a thin film of heat-resistant material formed according to the present invention.
Figure 20B:
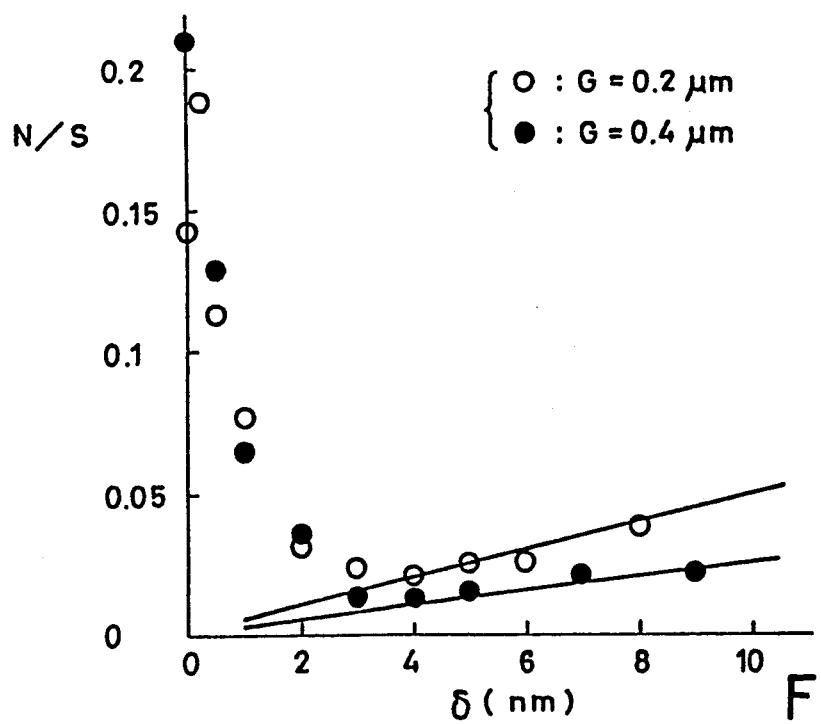

Measurement was made as to the relation between the thickness δ of the heat-resistant thin films and the ratio N/S using magnetic heads prepared with the same conditions as those for the sample (d) or (e) shown in table 1, except for the gap length G of each magnetic gap and the thickness δ of each heat-resistant thin film. More specifically, the relation between the thickness δ of the heat-resistant thin films and the ratio N/S was examined for magnetic heads having the gap length G of the magnetic gap 12 0.2 μm and the gap length G of 0.4 μm. The thickness δ of the heat-resistant thin films in each magnetic head having the gap length G was changed and the waviness degree in the frequency characteristics of the reproduced output obtained at that time was measured. In those measurements, a metal tape having coercive force Hc of about 14000 e was used and a frequency sweep signal of 0.5 to 5 MHz was recorded and reproduced with a head-tape relative traveling speed v of 3.1 m/s and an output ratio between a peak and a bottom in the frequency characteristic curve at 2 to 4 MHz as shown in FIG. 4 detected by a spectrum analyzer, that is, a waviness value Δe was examined. Based on this value Δe:

$$\Delta E = 20\log \frac{S + 2N}{S - 2N} \text{ (dB)},$$

the ratio N/S was obtained. The results are shown in FIGS. 20A and 20B. FIG. 20B is an enlarged diagram of the range from 0 to 10 nm of δ in FIG. 20A. From those figures, it is understood that the thickness δ of the heat-resistant thin films is 20 nm and the ratio N/S is about 1/10 when the magnetic gap length G is 0.2 μm and that the thickness δ of the heat-resistant thin films is 40 nm and the ratio N/S is about 1/10 when the magnetic gap length G is 0.4 μm. More specifically, it is verified that if the thickness δ of the heat-resistant thin films is 1/10 or less of the magnetic gap length G, the ratio N/S is 1/10 or less. It can be also verified that if the thickness δ of the heat-resistant thin films is 1/20 or less of the magnetic gap length G, the ratio N/S is 1/20 or less.

In addition, if the thickness δ of the heat-resistant thin films is too small, the films cannot serve to make disappear waviness due to pseudo gaps. For this reason, in the cases of the gap length G being 0.2 μm and 0.4 μm, the film thickness δ needs to be 1 nm or more in order to set the ratio N/S to 0.1 or less and the film thickness δ needs to be 2 nm or more in order to set the ratio N/S to 0.05 or less. Those relations can be easily confirmed from FIG. 20B.

The above described effects of the heat-resistant thin films can be achieved in a stable manner if those films are made of an oxide material such as $SiO_2$. However, if the heat-resistant thin films are made of a high melting metal material such as Ti, the same effects can be obtained insofar as the temperature to be increased in the glass melting step is suppressed to about 700° C. or less.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a magnetic core half in a magnetic head having a magnetic gap between a pair of said magnetic core halves opposed to each other through a non-magnetic material, a vicinity of said magnetic gap including ferromagnetic metal material, said method comprising the steps of:
   preparing a magnetic core half member made of a ferromagnetic oxide and having a gap forming face to be opposed to form said magnetic gap;
   etching said gap forming face to remove an upper layer which is adversely affected by such preparation;
   applying reverse sputtering to said etched gap forming face using inert gas ions to remove impurities adhered on said gap forming face; and
   forming a ferromagnetic thin film of a ferromagnetic metal material on said reverse-sputtering gap forming face.

2. A method of manufacturing a magnetic core half in a magnetic head having a magnetic gap between a pair of said magnetic core halves opposed to each other through a non-magnetic material, a vicinity of said magnetic gap including ferromagnetic metal material, said method comprising the steps of:
   preparing a magnetic core half member made of a ferromagnetic oxide and having a gap forming face to be opposed to form said magnetic gap;
   treating said gap forming face to cause said gap forming face to have an appearance exposing a grown crystal of said ferromagnetic oxide;
   forming a heat-resistance thin film of a heat-resistant material on said treated gap forming face; and
   forming a ferromagnetic thin film of a ferromagnetic metal material on said heat-resistant thin film.

3. A method of manufacturing a magnetic core half according to claim 2, wherein said step of forming said heat-resistant thin film includes forming said heat-resistant thin film by sputtering.

4. A method of manufacturing a magnetic core half according to claim 2, wherein said step of treating said gap forming face includes the step of etching said gap forming face.

5. A method of manufacturing a magnetic core half according to claim 1 or claim 2, wherein said step of forming said ferromagnetic thin film includes forming said ferromagnetic thin film by sputtering.

6. A method of manufacturing a magnetic core half according to claim 2, wherein said step of treating said gap forming face includes the steps of etching said gap forming face and applying reverse sputtering to said gap forming face using inert gas ions.

7. A method of manufacturing a magnetic core half according to claim 1 or claim 6, wherein said step of etching said gap forming face includes immersing said magnetic core half member in a phosphorous acid solution.

8. A method of manufacturing a magnetic core half according to claim 1 or claim 6, wherein said step of applying reverse sputtering includes setting a minus peak value of voltage applied to said magnetic core half member within a range between $-100$ to $-500$ volts.

* * * * *